(12) United States Patent  
Bogat

(10) Patent No.: US 7,386,472 B1  
(45) Date of Patent: Jun. 10, 2008

(54) SELF-CHECKOUT TERMINAL

(75) Inventor: Antonio R. Bogat, Duluth, GA (US)

(73) Assignee: NCR Corporation, Dayton, OH (US)

( * ) Notice: Subject to any disclaimer, the term of this patent is extended or adjusted under 35 U.S.C. 154(b) by 703 days.

(21) Appl. No.: 10/013,078

(22) Filed: Dec. 10, 2001

(51) Int. Cl.
*G06Q 90/00* (2006.01)

(52) U.S. Cl. ........................................................ 705/23

(58) Field of Classification Search ................. 705/16, 705/23; 235/383
See application file for complete search history.

(56) References Cited

U.S. PATENT DOCUMENTS

| | | | | |
|---|---|---|---|---|
| 2,919,851 A | * | 1/1960 | Otis | 235/383 |
| 3,681,570 A | * | 8/1972 | Abt | 235/383 |
| 3,681,571 A | * | 8/1972 | Strohschneider | 235/383 |
| 3,836,755 A | * | 9/1974 | Ehrat | 235/383 |
| 4,676,343 A | * | 6/1987 | Humble et al. | 186/61 |
| 4,779,706 A | * | 10/1988 | Mergenthaler | 235/383 |
| 4,787,467 A | * | 11/1988 | Johnson | 235/383 |
| 4,792,018 A | * | 12/1988 | Humble et al. | 186/61 |
| 5,543,607 A | * | 8/1996 | Watanabe et al. | 235/383 |
| 5,662,190 A | * | 9/1997 | Abe | 235/383 |
| 5,952,642 A | * | 9/1999 | Lutz | 235/383 |
| 6,145,629 A | * | 11/2000 | Addy | 235/383 |
| 6,155,486 A | * | 12/2000 | Lutz | 235/383 |
| 6,315,199 B1 | * | 11/2001 | Ito et al. | 235/383 |
| 2003/0001007 A1 | * | 1/2003 | Lee et al. | 235/383 |

* cited by examiner

*Primary Examiner*—Gerald J. O'Connor  
(74) *Attorney, Agent, or Firm*—Priest & Goldstein, PLLC

(57) ABSTRACT

A self-checkout lane in a store comprises an incoming goods path for receiving goods, first and second goods collection zones, and a segregation device operable under control of a computer processor to divert goods from the incoming goods path into one or the other of the two goods collection zones. The incoming goods path includes a product scanner electrically coupled to the computer processor and operable to evaluate the total retail price of a plurality of goods. The goods of a first customer are diverted to the first goods collection zone. After receiving payment for the goods, the computer processor operates the segregation device to allow the first customer to access their goods, and to meanwhile divert subsequent goods of a second customer to the second goods collection zone, thereby facilitating the swift and efficient use of the self-checkout terminals by customers. The invention also includes security means to help guard against misappropriation of goods.

10 Claims, 1 Drawing Sheet

SELF-CHECKOUT TERMINAL

This invention relates to improvements to a self-checkout terminal. It is particularly applicable, but by no means limited, to those that may be found in supermarkets.

BACKGROUND TO THE INVENTION

In supermarkets and other stores, the introduction of modern self-service checkouts (or self-checkouts) has enabled customers to perform the checkout procedure themselves, with little or no intervention from store personnel. This checkout procedure involves the weighing of grocery items, the addition of the prices of all the goods being bought, and the payment to the store of the total charge due. By enabling customers to carry out this procedure themselves, customers are able to check out of the store more quickly, queues or lines are reduced in length, and people spend less time waiting in line to be served. Furthermore, the store will require fewer personnel in checkout roles, and so may deploy them elsewhere in the store to assist customers, or alternatively may be able to reduce the total workforce and thereby save on payroll costs. Such a saving may be passed on to customers as lower priced goods, or may enable the store's profits to be increased.

However, as a greater number of customers decide to use self-checkouts to buy a large number of items, self-checkout users will find themselves waiting in line for longer periods of time. This may lead to frustration amongst the customers, a decrease in customer satisfaction, less frequent use of the self-checkout facilities, and a lower return on investment for the store. It is important that customers' confidence in self-checkout facilities should not be harmed by long lines.

Another disadvantage associated with self-checkouts is the greater potential for shoplifting. Since customers are trusted with checking out their goods for themselves, with little or no supervision from store personnel, incidents of theft from the store may become more prevalent. Furthermore, some customers may, quite innocently, make a mistake in their use of the self-checkout facility and consequently not pay fully for their goods.

Accordingly, it is a general object of the present invention to overcome or at least mitigate at least some of the problems, shortcomings and disadvantages associated with self-checkouts as identified above.

SUMMARY OF THE INVENTION

According to a first aspect of the invention there is provided a self-checkout lane for goods transactions in a retail outlet, the self-checkout lane comprising a processor, an incoming goods path for receiving goods; first and second goods collection zones in communication with the incoming goods path; and a segregation device operable under the control of the processor to divert goods from the incoming goods path into one of the goods collection zones; wherein the incoming goods path includes a product scanner electrically coupled to the processor and operable to evaluate the total retail price of a plurality of goods; each segregated goods collection zone being at least partially bounded by a barrier device operable under the control of the processor to selectively prevent a customer from accessing the goods contained therein; and wherein the processor is configured: (a) to operate the barrier device to prevent a first customer from accessing their goods from a goods collection zone until they have been paid for; and, once the first customer has paid for their goods, (b) to operate the barrier device to enable the first customer to access their goods, and (c) to operate the segregation device such that the first customer may remove their goods from their goods collection zone whilst a second customer introduces their goods to the incoming goods path.

This has the advantage of enabling a single self-checkout terminal to serve two or more customers at any one time. Through the automated operation of the segregation device, diverting goods into a segregated goods collection zone, one customer is able to pack or bag his items from a goods collection zone whilst, simultaneously, another customer uses the incoming goods path for processing her items of shopping. The second customer does not need to wait for the first customer to complete the packing of his items before she is able to start processing her items. This advantageously enables faster, more efficient handling of customers, thereby minimizing lines or queues and giving rise to a high level of customer satisfaction. The barrier device advantageously prevents customers from carrying away goods before their goods have been paid for.

Preferably each goods collection zone includes an integral weighing scale electrically coupled to the processor, and, for a given transaction, the processor is further configured to calculate a total weight of the said goods received in the incoming goods path and to compare the calculated total weight of the goods with a measured total weight of the same goods, the measured total weight being measured using an integral weighing scale once the goods are received in a goods collection zone.

The inclusion of a weighing scale in the goods collection zone advantageously provides a security feature which enables shoplifting or accidental theft to be identified and the appropriate action to be taken by store personnel or security guards.

A further advantage is that the quantity of goods that each customer may purchase via the self-checkout lane may be increased. A full shopping trolley of items may be paid checked out, and this should be contrasted with prior self-checkout facilities in which typically only a small basket of goods is able to be bought.

Preferably a weighing scale in a goods collection zone is positioned beneath a conveyor. This advantageously conceals the security weighing mechanism from the customer, and also, by using a conveyor, facilitates the rapid and efficient movement of goods through the terminal.

According to a second aspect of the invention there is provided a method of retailing using a self-checkout lane having an incoming goods path, first and second goods collection zones, and a segregation device operable to divert goods from the incoming goods path into one of the goods collection zones, the method being controlled by a processor and comprising the steps: (a) receiving a first customer's goods into the incoming goods path; (b) transferring the first customer's goods into the first goods collection zone; (c) receiving payment from the first customer for the goods in the first goods collection zone; (d) operating the segregation device in order to divert goods into the second goods collection zone; and (e) receiving a second customer's goods into the incoming goods path; wherein the step of receiving the second customer's goods is undertaken whilst the first customer removes his goods from the first goods collection zone.

According to a third aspect of the invention there is provided a method of detecting misappropriation of goods in a self-checkout lane in a store, the self-checkout lane having an incoming goods path and a goods collection zone, and goods being passed, in service, from the incoming goods path into the goods collection zone; the incoming goods path including a product scanner electrically coupled to a processor, and the goods collection zone including a weighing scale electrically coupled to the processor; the method being performed by a processor and comprising the steps: (a) receiving input from the product scanner identifying goods introduced by a customer into the incoming goods path; (c) calculating, by referring to a record of product weights, a total weight value representative of the total weight of the goods introduced into the incoming goods path; (d) receiving input from the weighing scale specifying the total weight of the goods once received in the goods collection zone; and (e) comparing the said total weight value with the said total weight of the goods and calculating any discrepancy between the said weights.

Step (a) may also include receiving input from a weighing scale also included in the incoming goods path, the input being representative of the weight of loose grocery items. This weight would be added to the said total weight value calculated in step (c).

If the said discrepancy as calculated above is greater than a predetermined value, the method preferably further comprises notifying store personnel or operating an alarm.

This advantageously provides a means by which shoplifting in self-checkout facilities may be combated. It also provides a means of attending to those customers who make a mistake in their use of the self-checkout facility and would consequently not pay fully for their goods.

BRIEF DESCRIPTION OF THE DRAWINGS

Embodiments of the invention will now be described, by way of example, and with reference to the drawings in which.

DETAILED DESCRIPTION OF THE PREFERRED EMBODIMENTS OF THE INVENTION

Figure 1:
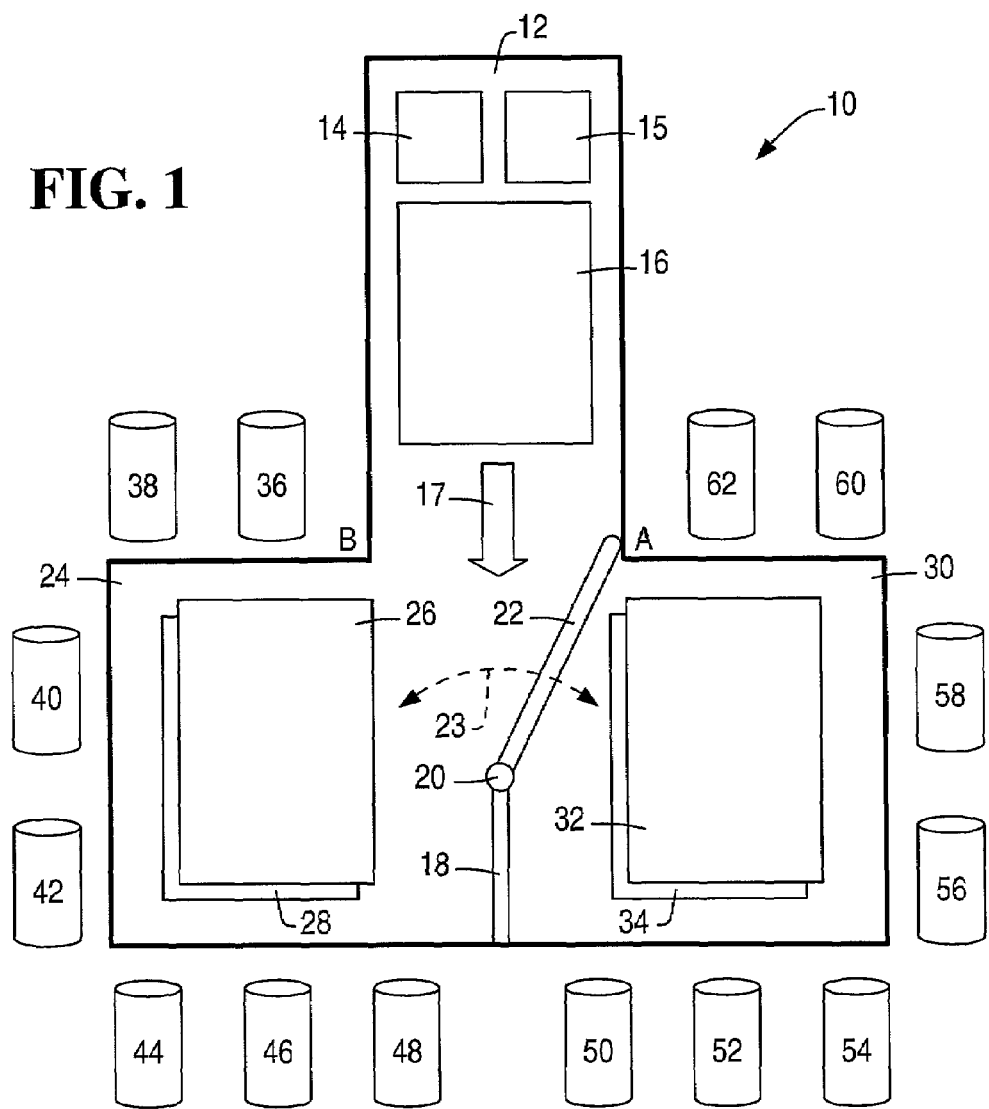
FIG. 1 illustrates a schematic plan view from above of a self-checkout lane in accordance with the present invention.

An example of a self-checkout lane in accordance with the present invention is shown in FIG. 1. Here, the self-checkout lane 10 comprises an incoming goods path 12 which includes a barcode scanner 14 operable to scan the barcodes printed on the packaging of items of shopping, and a weighing scale 15 for weighing grocery items. It will be appreciated that the barcode scanner 14 and the weighing scale 15 may be integrated into a combined device. Whilst being desirable, the weighing scale 15 is not essential for the operation of the invention. Further along the incoming goods path is a conveyor belt 16 operable to convey goods in the direction of the arrow 17.

The incoming goods path 12 leads into one or more goods collection zones. In the embodiment of the invention shown in FIG. 1, two goods collection zones 24, 30 are provided. Each zone 24, 30 has its own conveyor belt 26, 32, again operable in the direction of the arrow 17. Beneath each of the conveyor belts 26, 32 in the goods collection zones 24, 30 is a security weighing scale 28, 34. The security weighing scales 28, 34 are preferably concealed beneath the conveyor belts 26, 32 respectively, although this need not be the case and the security weighing scales 28, 34 may be openly visible. Indeed, the conveyor belts 26, 32 themselves are optional and are by no means essential for the operation of the present invention.

Goods sent along the conveyor belt 16 in the incoming goods path 12 are diverted into one or the other of the two goods collection zones 24, 30. This is achieved by means of a moveable arm 22 operable to swing 23 about a pivot 20 between points A and B as shown in FIG. 1. The pivot mechanism 20 is preferably motorized, and this may be operated under the control of a digital processor. In the preferred embodiment of the invention shown in FIG. 1, the pivot 20 is positioned at the end of a fixed barrier wall 18, although it will be appreciated that other arrangements of a moveable barrier may be devised that would have the same ability to divert goods into a goods collection zone as required.

Surrounding the first goods collection zone 24 are a plurality of shopping bag dispensing points 36, 38, 40, 42, 44, 46 and 48, whilst similar shopping bag dispensing points 50, 52, 54, 56, 58, 60, 62 are provided around the second goods collection zone 30. These shopping bag dispensing points may take any of the many forms of such devices or installations known to those skilled in the art.

As mentioned above, the diverting arm 22 may be swung by the operation of a processor-controlled motor at the pivot point 20. This facility may advantageously be incorporated in an automated procedure for processing customers through the self-checkout lane: Prior to a first customer using the self-checkout terminal, the processor assigns a goods collection zone for that customer. For the purposes of this example, this first customer will be assigned goods collection zone 24, to the left of the diagram. Accordingly, the processor causes the diverting arm 22 to be swung such that it is in position A and the second goods collection zone 30 is thereby shut off—as shown in FIG. 1. The first customer then introduces his goods to the incoming goods path 12, scans the barcodes using the scanner 14 and weighs items of loose groceries with the weighing scale 15. The goods are then placed on the moving conveyor 16 which delivers them to the goods collection zone 24 using the conveyor 26. The processor of the self-checkout terminal evaluates the total cost of the sale of goods to the customer, and displays the payment due on a display screen. The customer is then requested to pay for the goods, either using a credit card or debit card via a payment card acceptor, or, alternatively, via an automated cash acceptance and discrimination device. Both these means for effecting a transaction are known to those skilled in the art, and will not be discussed in any further detail herein.

Once the first customer has paid for his goods, and the last item scanned has passed through into the goods collection zone 24, the moving barrier 22 is swung under the control of the processor into position B, thereby opening the second goods collection zone 30 into communication with the incoming goods path 12. A second customer may now begin introducing his goods to the incoming goods path 12, whilst the first customer bags his items using the various carrier bags 36-48 provided around the periphery of the goods collection zone 24. Whilst the first customer is doing this, the second customer's goods are conveyed through into the second goods collection zone 30. In due course, once the second user has paid for his goods, the arm will swing back to position A, enabling a third user to use the self-checkout lane whilst the second user bags his shopping using carrier bags 50-62. This alternating procedure may continue indefinitely.

A important aspect of the present invention will now be described, relating to security and provisions for preventing and deterring shoplifting or accidental removal of goods without paying. As described above, each goods receiving zone 24, 30 comprises a security weighing scale 28, 34. The purpose of the weighing scales 28, 34 is to weigh the total weight of the goods bought by the customer. Accordingly, the weighing scales 28, 34 are shaped and sized so as to substantially fill each of the goods collection zones 24, 30. In FIG. 1, in the interest of clarity, they are shown as not filling the entire of the goods collection zones 24, 30, but in practice they would be cover as large an area as possible.

A preferred method by which the security provisions function is as follows: In advance of the customers' use of the self-checkout terminal, the processor is pre-programmed by store personnel with the weight of each item on sale in the store. Alternatively the processor is provided with access to a database (e.g. the store's stock control database) containing the weights of the articles on sale.

During the checkout procedure the customer may himself weigh loose items of groceries (e.g. fruit and vegetables) using the weighing scale 15 in the incoming goods path 12. This weighing scale 15 is also connected to the processor. Alternatively, before reaching the checkout, the customer may use another weighing scale provided elsewhere in the store, which issues him with a label having a barcode that is readable by the scanner 14 to identify the loose grocery items and their weight.

Therefore, using a database or some other record of product weights as mentioned above, together with the weights of any loose grocery items, the weight of each item that has been introduced to the incoming goods path 12 is obtained by the processor, and the total weight is readily calculated.

Once all the goods being checked out by a particular customer have passed through onto the security weighing scale 28 (or 34), the processor is configured to obtain a weight measurement from the security scale 28 of the total weight of the goods received in the collection zone 24. The processor then compares the total weight of goods received with the total weight of goods introduced to the incoming goods path, and if there is a substantial discrepancy an alert may be sounded or a member of the store personnel informed. If the weight of goods received on the security scale 28 is greater than that which has been recorded by the weighing scale 15 and product scanner 14, then this may suggest that the customer has (perhaps inadvertently) failed to scan or weigh all the items at the entrance to the incoming goods path, suggesting a possible attempt at shoplifting. Conversely, if the total weight of goods received on the security scale 28 is less than that recorded for sale in the incoming goods path, then this would suggest that items may have been misappropriated at some point in the self-checkout process.

Figure 2:
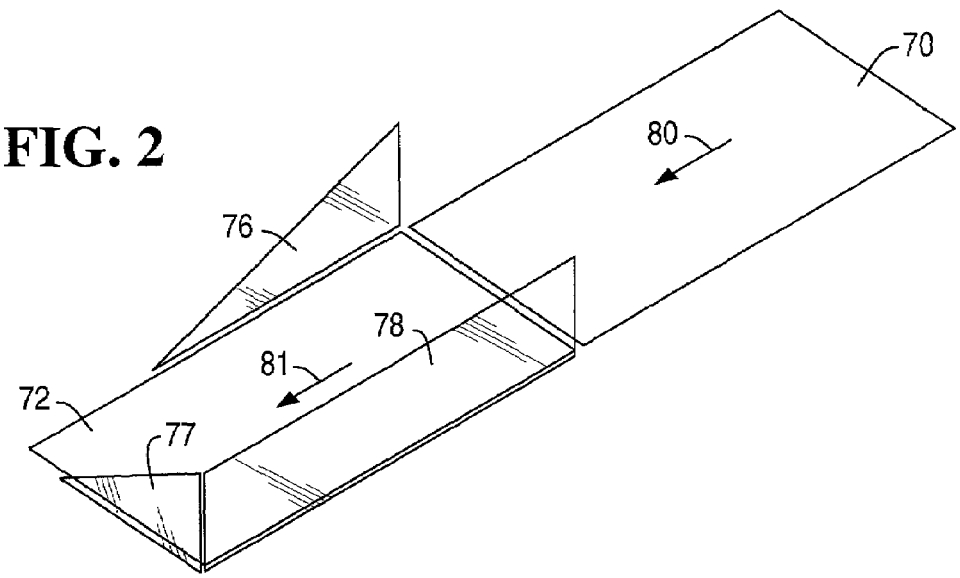
FIG. 2 illustrates a retractable barrier provided around a goods collection zone of another self-checkout lane.

To further prevent the misappropriation of items during the self-checkout procedure, a plurality of retractable barriers are employed around each goods collection zone. FIG. 2 shows only a single goods collection zone of a self-checkout lane. Here, goods introduced to the incoming goods path 70 (and weighed and scanned as described previously) pass, in the direction of the arrow 80, directly into the goods collection zone 72. A security weighing scale is also present in the goods collection zone 72, and optionally a conveyor mechanism is additionally included to move the articles in the direction shown by the arrow 81.

As shown in FIG. 2, in the interest of security and to combat shoplifting, a plurality of retractable barriers 76, 77, 78 are provided. These barriers serve to prevent customers from accessing their goods until payment has been completed, and also prevent customers from picking up and moving their goods (so-called "late shuffling") which would potentially confuse the security weighing scale.

Once payment of the goods has been made, the barriers 76, 77, 78 are withdrawn under the control of the processor, thereby enabling the customer to collect their goods.

A system of retractable barriers may be provided around any number of goods collection zones. In FIG. 1, for example, each goods collection zone 24, 30 may be provided with its own set of independently-operable retractable barriers, each set being withdrawn once the respective customer has completed paying for their goods. Preferably the retractable barriers are made of a transparent material such as glass or a transparent plastics material, thereby enabling the customers to view their items as they move into the appropriate goods collection zone.

The invention claimed is:

1. A method of detecting misappropriation of goods in a self-checkout lane in a store, the self-checkout lane having an incoming goods path and a goods collection zone, and goods being passed, in service, from the incoming goods path into the goods collection zone; the incoming goods path including a product scanner electrically coupled to a processor, and the goods collection zone including a weighing scale electrically coupled to the processor, the method being performed by a processor and comprising the steps:

(a) receiving input from the product scanner identifying goods introduced into the incoming goods path;

(b) controlling one or more barriers at least partially surrounding the goods collection zone so as to restrict customer access to goods collecting in the goods collection zone;

(c) calculating, by referring to a database of product weights, a total weight value representative of the total weight of the goods introduced into the incoming goods path;

(d) once all the goods being checked out by a particular customer have passed onto the weighing scale, weighing the goods collectively at the goods collection zone by the weighing scale and producing a total weight signal for all the goods;

(e) receiving from the weighing scale the total weight signal; and (f) comparing the total weight value of the goods introduced into the incoming goods path with the total weight of the goods collected at the goods collection zone and calculating a discrepancy between said weights; and (g) if the calculated discrepancy exceeds a predetermined value, inhibiting conclusion of a transaction for purchase of goods introduced into the incoming goods path and collected in the goods collection zone and continuing to control the one or more barriers at least partially surrounding the goods collection zone so as to restrict access until the discrepancy is resolved and the transaction is concluded.

2. The method of detecting misappropriation of goods as claimed in claim 1 further comprising:
   notifying store personnel if the calculated discrepancy is greater than the predetermined value.

3. The method of claim 1 further comprising:
   operating an alarm if the calculated discrepancy is greater than the predetermined value.

4. The method of claim 1 wherein the weighing scale is positioned beneath the goods collection zone.

5. The method of claim 4 wherein the goods collection zone further includes a conveyor.

6. The method of claim 4 wherein the weighing scale is shaped and sized so as to substantially fill the goods collection zone.

7. The method of claim 1 wherein the step of calculating a total weight value by referring to a record of product weights further comprises:
 weighing loose grocery items in the incoming goods path.

8. The method of claim 1 further comprising:
 automatically retracting the one or more barriers at least partially surrounding the goods collection zone when the calculated discrepancy is less than the predetermined value and payment for the collected goods has been made.

9. The method of claim 1 wherein if the calculated discrepancy is less than the predetermined value, the transaction for purchase of goods introduced into the incoming goods path is concluded; and the method further comprises controlling the one or more barriers to allow customer access to the goods collection zone to bag the goods.

10. The method of claim 9 further comprising:
 operating a diverter to direct goods of a second customer to a second goods collection zone.

* * * * *